Oct. 6, 1931.      J. W. POORMAN      1,826,523
AUTOMATIC TIRE PRESSURE MAINTAINER
Filed March 8, 1929    2 Sheets-Sheet 1
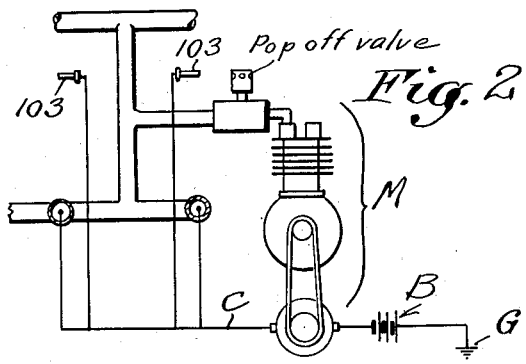
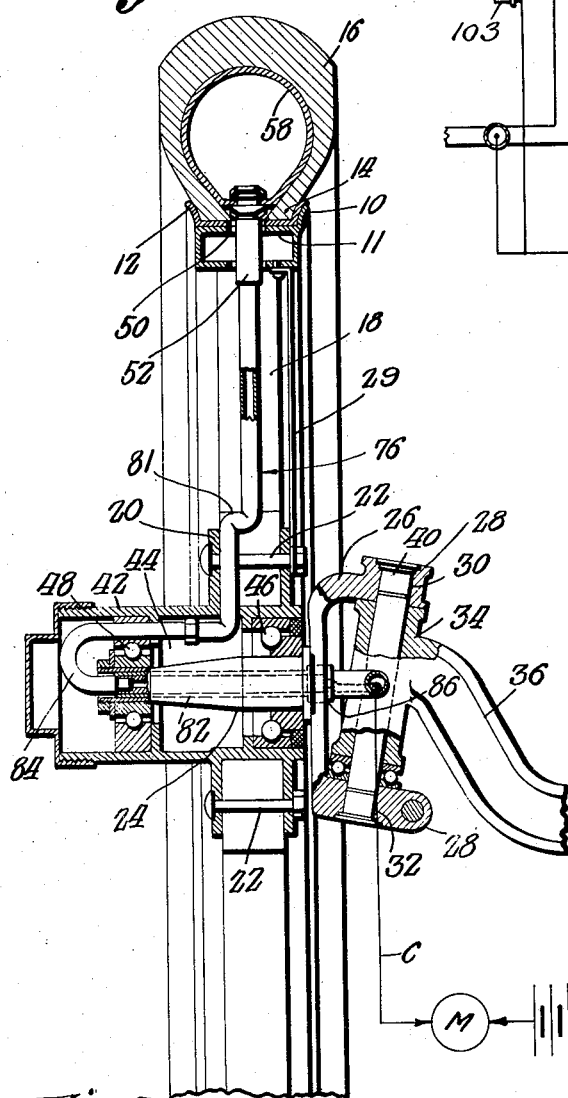
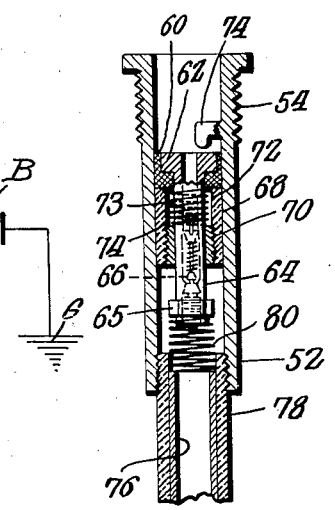
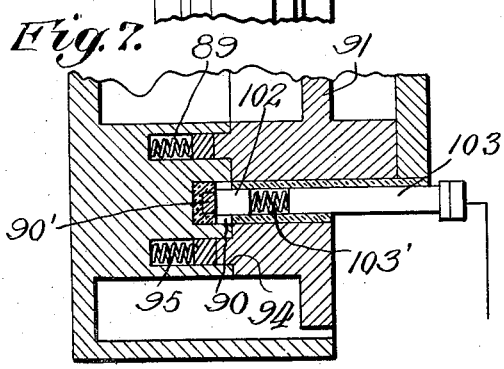
J. W. Poorman,
INVENTOR
BY Victor J. Evans
ATTORNEY Oct. 6, 1931.  J. W. POORMAN  1,826,523
AUTOMATIC TIRE PRESSURE MAINTAINER
Filed March 8, 1929  2 Sheets-Sheet 2
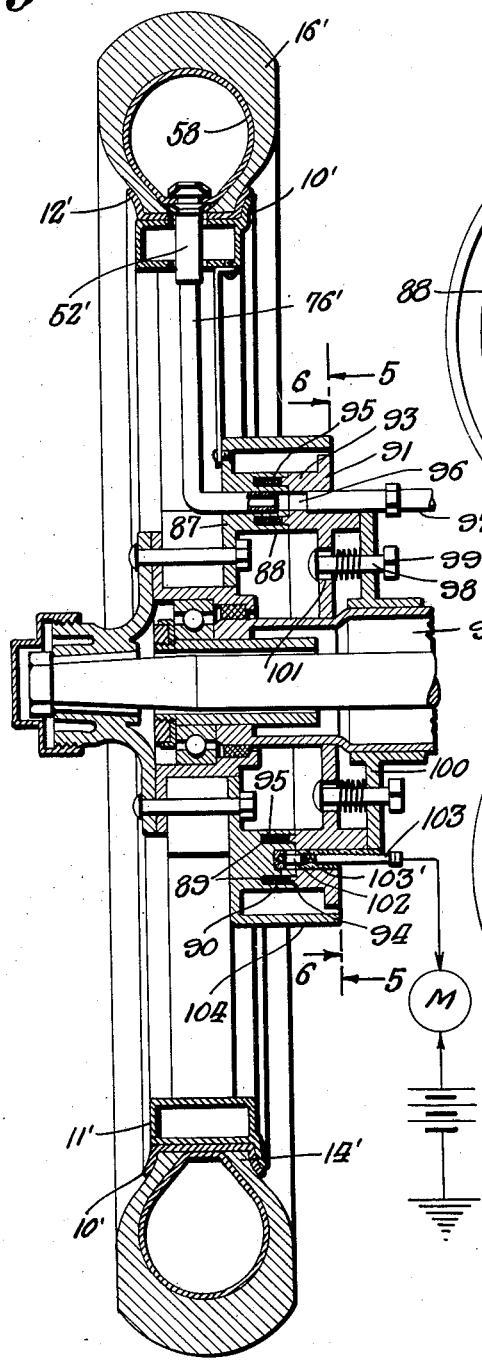
Fig. 4.
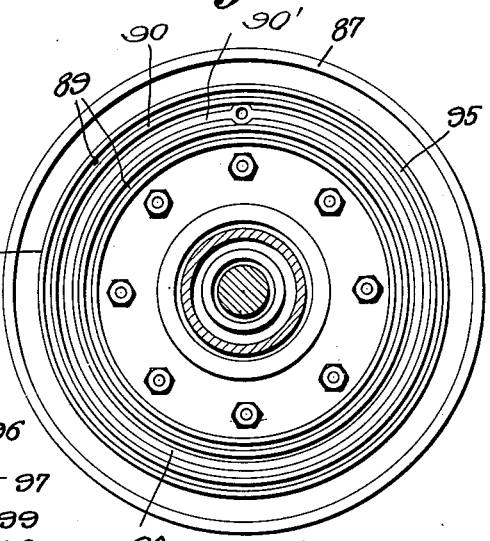
Fig. 5.
Fig. 6.
J. W. Poorman,
INVENTOR
BY Victor J. Evans
ATTORNEY Patented Oct. 6, 1931

1,826,523

UNITED STATES PATENT OFFICE

JOHN W. POORMAN, OF BLANCHESTER, OHIO

AUTOMATIC TIRE PRESSURE MAINTAINER

Application filed March 8, 1929. Serial No. 345,344.

This invention relates to automatic tire pressure maintainers and more particularly to an automatic air injecting device that will maintain the tire of an automobile in inflated condition at all times and under all conditions of travel of the vehicle.

A still further object of the invention is to provide a tire inflating device that will be operative to automatically inflate the tire of a vehicle whenever the pressure in the same drops below a predetermined minimum, regardless of whether the vehicle is at a standstill or whether the same is moving over the surface. It is obvious then a device that will accomplish these features will eliminate the necessity of the operator of the vehicle testing the tires for pressure at frequent intervals and it will eliminate the necessity of frequent search for a public air hose and the subsequent discomfort of having to go through the operation of refilling the tires.

Such a device will further reduce the possibility of encountering tire trouble on the road as the tire may be kept inflated even though the tire is punctured until it is convenient for the operator to have the same repaired.

With these and many other objects in view that will more readily appear as the nature of the invention is better understood, the same consists in the novel construction, combination and arrangement of parts shown in the accompanying drawings in which:

Figure 1 is a transverse sectional view taken thru a vehicle wheel, showing the manner in which the principles of my invention are applied to the front traction wheels of a vehicle wheel.

Figure 2 is a diagrammatical view, illustrating the motor and compressor.

Figure 3 is an enlarged sectional view taken thru the tire valve shown in Figure 2.

Figure 4 is a sectional view similar to Figure 1 showing the principles of the invention applied to the rear differential traction wheels of the vehicle.

Figure 5 is a sectional view taken along the line 5—5 of Figure 4.

Figure 6 is a sectional view taken along the line 6—6 of Figure 4.

Figure 7 is a fragmentary enlarged sectional view illustrating the electrical connection employed in the hub of the rear wheel.

In all of the above mentioned views, like characters of reference are employed to designate like parts and the rim of a motor vehicle wheel is shown at 10. This rim is of the conventional type and is provided with the usual tire retaining flanges 12 adapted to maintain the beads 14 of a tire 16 therebetween. The wheel is shown at 18 and this wheel may be of any standard type, as for example either disk, wire, wood or the like but in the accompanying drawings I have preferred to show the same as being of the wooden spoke type for convenience of description.

The wheel is provided with spokes 18, secured to a felly 11 having the rim thereon. The inner ends of the spokes are connected to a common hub plate 20 by means of suitable hub bolts 22. A spindle is designated at 24. This spindle is formed integrally with a spider 26, the ends of which terminate in bushings 28 presenting aligned apertures 30 and 32. The bushings 28 are adapted to receive therebetween a bushing 34 formed on the front axle 36 and having a bore 38 therein in alignment with the apertures 30 and 32.

A spindle 40 extends thru the bushings 28 and 34 and holds these parts in pivotal relationship. The hub plate 20 is provided with a hub casing 42 having the usual grease chamber 44 therein. The hub casing is provided with inner and outer bearings 46 and 48 respectively in which bearings the spindle 24 is mounted. The above mentioned parts as described are purely conventional in their form and no claim is made as to the novelty of the same.

The novelty lies in the arrangement of parts whereby the tire may be automatically inflated, and which will now be described in full. A conductor strip 29 is fastened to the felly and the hub to form a part of an electrical circuit which will be hereinafter more full described. The felly 11 has aligned apertures 50 therethrough, through which a tire valve casing 52 is adapted to pass. A pair of retaining nuts 56, threaded onto the casing, clamp the inner tube 58 of the tire 16 therebetween.

Positioned in the casing 52 is a soft rubber member 60 having a brass plug 62 in the top thereof. The plug 62 is provided with a tubular shank 64. This shank is provided with a nut 65 on its inner end. Mounted within the shank 64 and threadedly held against displacement therein is the conventional type of Schrader valve 66 commonly used in automobile tire valve stems.

The shank 64, together with the members 60 and 62, are slidable within the casing 52 and the shank is insulated from the side of this casing by a tubular sleeve 68 having a plug 70 threaded therein to provide a recess 72 in which there is disposed a coil spring 73 normally adapted to urge the plug 62 and the shank 64 surrounding the sleeve 60, outwardly into engagement with a contact 74 on the inside of the casing 52. The inner end of the casing 52 is threaded interiorly and is adapted to receive the end of a steel pipe 76 having insulation 78 thereon. This pipe is connected to the shank 64 by a conductor 80 in the form of a coil spring.

It will be seen, therefore, that the plug 62 and its depending shaft 64 having the Schrader valve therein, together with the pipe 76, is insulated from the valve casing 52 by means of the insulation 60, 68 and 78, for a purpose to be described hereinafter.

It will also be seen that when the valve assembly is in a position on a vehicle tire at high pressures, the force exerted on the face of the plug 62 and its surrounding sleeve 60 will be sufficient to force the plug away from the contact 74, but at low pressures, depending on the tension of the coil spring 73, the plug 62 will be urged into contact with the contact 74.

The pipe 76 is bent, as at 81, to extend downwardly into the hub cap 42, where the same is reversed, as at 84, with its extremity in communication with a bore 82 extending longitudinally through the spindle 24. The said part 84 is connected with the spindle by a packing nut. Another section of the pipe passes through the spindle and passes therefrom at 86, and leads to the exhaust side of a compressor or the like, the motor of which is shown at M in Figure 1.

The pipe 76 is insulated throughout its entire length from all metal parts of the wheel or frame of the vehicle and a conductor, diagrammatically shown in Figure 1 and designated c, is connected to this pipe and to one terminal of the motor M. The other terminal of this motor is electrically connected to a battery B which is connected to a ground G and the ground G' is the metal frame of the vehicle to which the device is applied.

The above mentioned parts are believed to adequately define the nature of the invention as applied to the front wheel of a motor vehicle, and I will now proceed with a full description of the operation of the device.

When the tire is fully inflated under normal conditions, depending upon the weight of the car, size and style of the tire and other contributing factors, the pressure of air in the tire, acting upon the upper surface of the plug 62 in the rubber bushing 60, will be sufficient to maintain the same out of contact with the element 74 so that the circuit through the motor M will be open, thereby rendering the compressor inoperative. However, if the pressure in the tire should drop below the predetermined minimum, due to any cause, such as leakage of air or puncture of the tire, determined by the tension of the spring 73, the spring will urge the plug 62 into contact with the element 74 and close the circuit through the motor M, conductor c, pipe 76, contact 74, valve stem 52 and strip 29 to the metal part of the wheel or ground. This will cause the motor M to drive the compressor and supply air through the pipe 76 to the valve assembly communicating with the interior of the tire. When the pressure in the tire has been built up to a predetermined point, the pressure of air on the plug 62 will force the same out of contact with the element 74 and again open the circuit through the motor M to stop the same. The tension of the spring 73 can be adjusted by means of the plug 70. This occurs when the pop off valve opens thereby relieving the pressure on the inner end of the valve 62. The tension of the spring 73 may be adjusted by means of the plug 17.

Figures 4, 5 and 6 show the arrangement of parts used on each rear wheel. In this case, a member 87 is fastened to the hub of the rear wheel and is formed with an annular part 88 which contains on its inner face a pair of annular grooves 89 and a larger annular groove 90 which is arranged between the grooves 89. The insulated pipe 76', which is connected with the stem 52', is in communication with the groove 90. A member 91 is arranged on the rear housing 92 and is formed with an annular part 93 which abuts the annular part 88 and this part 91 has on its outer face the annular ribs 94 which enter the grooves 89 and spring pressed packing means 95 are placed in the grooves 89 and bear upon the ribs 94. This member 91 is also formed with a port 96 to receive an end of a pipe 97 which is connected with the compressor, and as the port 96 is in communication with the groove 90, air will enter the groove and thus pass through the pipe 76' to the valve mechanism in the stem 72' and the packing means 95 will prevent escape of air from the groove. The member 91 is pressed against the member 87 through means of the springs 98 on the bolts 99 which connect the member 91 with a flange 100 on the housing 92. These bolts pass through slots 101 in the member 91, so that this member is self-adjusting to the relative movement between the wheel hub and the housing 92.

A contact ring 90' is located in the groove 90 and electrically insulated therefrom and has an electrical contact with the insulated tube 56' and is engaged by a shoe or brush 102 carried by and insulated from the member 91. A contact terminal 103 is carried by member 91 and insulated therefrom and is electrically connected to the brush by springs 103'. The terminal 103 is electrically connected to the motor M. The member 91 carries the brake drum 104.

Thus it will be seen that the arrangement of the members 87 and 91 will permit air to pass from the supply pipe 97 to the pipes 76', while the wheel is rotating, and the shoe will electrically connect the member 87 with the motor of the generator while the wheel is rotating, so that as soon as the member 62 engages the contact 74, the circuit to the motor will be completed and the generator started.

The pressure generated by the compressor should be adjusted according to the pressure carried by the tires. For instance, if the tires are to carry a pressure of 40 pounds, the compressor pressure should be somewhere between 40 pounds and 45 pounds, so as not to open the valves of the other tubes, thereby adding to their pressure also.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

An automatic tire pressure maintainer comprising a casing one end of which is mounted in and in communication with a tire and the other end connected to an electrically actuated air supply means, a stationary contact carried by the interior of the casing and electrically connected to said supply means, an insulating sleeve mounted in the casing, a cushion member of insulating material in the casing and engaging one end of the sleeve, a tubular member slidable in said sleeve and cushion member and having a head to abut the cushion member when in one position, said tubular member constituting a piston subject to air pressure in the tire and forming a movable contact and electrically connected to said supply means, a valve in said tubular member to admit air under pressure to the tire and adapted to prevent escape of air from the tire, and tension means for urging the tubular member into engagement with the stationary contact when the air pressure in the tire acting against the head of the tubular member falls below a predetermined pressure.

In testimony whereof I affix my signature.

JOHN W. POORMAN.